United States Patent
Churchill et al.

(10) Patent No.: US 9,593,739 B2
(45) Date of Patent: Mar. 14, 2017

(54) NEGATIVE STIFFNESS HYDRAULIC SYSTEM

(71) Applicant: HRL Laboratories, LLC, Malibu, CA (US)

(72) Inventors: Christopher B. Churchill, Ventura, CA (US); Guillermo A. Herrera, Winnetka, CA (US); Geoffrey P. McKnight, Los Angeles, CA (US); Jacob J. Mikulsky, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 49 days.

(21) Appl. No.: 14/561,185

(22) Filed: Dec. 4, 2014

(65) Prior Publication Data

US 2015/0204413 A1 Jul. 23, 2015

Related U.S. Application Data (60) Provisional application No. 61/913,163, filed on Dec. 6, 2013.

(51) Int. Cl.
| | | |
|---|---|---|
| *F16F 7/00* | (2006.01) | |
| *F16F 15/02* | (2006.01) | |
| *F16F 13/28* | (2006.01) | |

(52) U.S. Cl.
CPC ............ *F16F 15/022* (2013.01); *F16F 13/28* (2013.01); *F16F 2228/063* (2013.01); *F16F 2228/066* (2013.01)

(58) Field of Classification Search
CPC .. F16F 13/14; F16F 13/26; F16F 15/02; F16F 13/10; F16F 15/08; F16F 13/08;
(Continued)

(56) References Cited

U.S. PATENT DOCUMENTS

| | | | |
|---|---|---|---|
| 5,244,170 A | 9/1993 | Shekher | |
| 8,899,393 B2 * | 12/2014 | Kraner | G05B 19/404 |
| | | | 188/266.7 |

(Continued)

FOREIGN PATENT DOCUMENTS

| | | |
|---|---|---|
| EP | 0487637 B1 | 12/1998 |
| WO | WO 2013/039401 A1 | 3/2013 |
| WO | WO 2013/062406 A1 | 5/2013 |

OTHER PUBLICATIONS

Yu, et al., "A literature review of automotive vehicle engine mounting systems," Mechanism and Machine Theory 36 (2001) 123-142.

(Continued)

*Primary Examiner* — Steven Marsh
(74) *Attorney, Agent, or Firm* — Lewis Roca Rothgerber Christie LLP (57) ABSTRACT

A variable stiffness structure configured to support a variable load, the variable stiffness structure including a positive stiffness element coupled to the variable load, a negative stiffness element, a hydraulic system coupled to the positive and negative stiffness elements and configured to adjust a relative position of the positive and negative stiffness elements in response to a change in the variable load, while the variable stiffness structure supports the variable load.

26 Claims, 6 Drawing Sheets

(58) Field of Classification Search
CPC ........ F16F 13/105; F16F 15/04; F16F 13/106;
F16F 13/18; F16F 13/264; F16F 13/262;
F16F 15/022; F16F 13/20; F16F 1/387;
F16F 13/007; F16F 13/085; F16F
13/1445; F16F 13/266; F16F 15/063;
F16F 15/10; F16F 15/1201; F16F 15/18;
F16F 15/223; F16F 15/31; F16F 15/315;
F16F 1/021; F16F 1/024; F16F 1/041;
F16F 1/06
USPC ................ 248/560, 562, 565, 566, 636, 638
See application file for complete search history.

(56) References Cited

U.S. PATENT DOCUMENTS

| | | | |
|---|---|---|---|
| 2013/0118098 A1 | 5/2013 | Constantinou et al. | |
| 2013/0233998 A1* | 9/2013 | Bueter | F16F 7/1005 248/566 |
| 2015/0136937 A1* | 5/2015 | Xu | F16F 15/02 248/566 |

OTHER PUBLICATIONS

International Search Report and Written Opinion for International Application No. PCT/US2014/068670 dated Aug. 26, 2015, 8 pgs.
International Preliminary Report on Patentability for International Application No. PCT/US2014/068670, mailed Jun. 16, 2016, 6 pages.

\* cited by examiner

FIG. 7

NEGATIVE STIFFNESS HYDRAULIC SYSTEM

CROSS-REFERENCE TO RELATED APPLICATIONS

This application claims the benefit of and priority to U.S. Provisional Application No. 61/913,163, filed Dec. 6, 2013, and is related to a U.S. patent application entitled "Negative Stiffness System with Variable Preload Adjustment," U.S. application Ser. No. 14/335,800, filed on Jul. 18, 2014, the entire contents of both applications are incorporated by reference herein.

FIELD

The following description relates generally to the stiffness of non-linear structures and, more particularly, to a negative stiffness hydraulic systems.

BACKGROUND

Negative stiffness can be generated by non-linear behavior. For instance, simple and widely used non-linear structures that can generate negative stiffness include snap-through beams, buckling beams, over-rotation, and rolling or sliding contact between components. Non-linear structures that exhibit both positive and negative stiffness are potentially useful in a variety of mechanical design applications. For instance, a negative stiffness element (e.g., a buckling-type beam that can exhibit non-linear behavior) can be combined with a positive stiffness element, such as a supporting spring, to provide a structure having zero or quasi-zero stiffness (QZS) over a range of displacements. The quasi-zero stiffness of the structure may be used (utilized) to isolate another object or mass (e.g. a structure, device, package, and/or an instrument) from unwanted vibrations because the transmission of vibrations through systems of very low stiffness is minimal. However, these related art isolating structures tend to be unstable in their isolating mode and are not easily utilized for their damping and shock isolation abilities, because manufacturing technologies and techniques are typically not accurate enough to create a QZS structure that does not require frequent tuning. Additionally, conventional QZS structures may not be capable of maintaining low to zero stiffness in the presence of large static load changes (e.g., large static force changes), which may induce a large displacement in the system. One approach is to use a motor to adjust a secondary, softer positive spring in parallel to the main support spring. However, this approach has the limitation of only being able to adjust to small changes in force. Another approach uses (utilizes) a passive negative stiffness system where a large motion would cause the negative stiffness element to disengage and slip in relation to the positive element. However, this system has a disadvantage that it is unable to reset to its minimum stiffness after slippage, which limits its ability to isolate unwanted vibrations.

Accordingly, what is desired is a low-cost, robust solution for re-centering negative stiffness without completely disengaging the negative stiffness element.

SUMMARY

Aspects of embodiments of the present invention are directed to a system capable of isolating vibrations while still supporting large static forces.

Aspects of embodiments of the present invention are directed toward various hydraulic isolation systems capable of isolating low-amplitude vibrations while concurrently undergoing large variations in static force. According to an embodiment, the hydraulic isolation system combines a controllable negative stiffness element with a hydraulic system, which provides a continuously variable adjustment of the connectivity between the negative stiffness element and some external positive stiffness system, to account for variations in static force through the negative stiffness element. According to another embodiment, compression in a passive negative stiffness element is maintained while the system is adjusted in response to variations in static force.

According to some embodiments of the present invention, there is provided a variable stiffness structure configured to support a variable load, the variable stiffness structure including: a positive stiffness element coupled to the variable load; a negative stiffness element; and a hydraulic system coupled to the positive and negative stiffness elements and configured to adjust a relative position of the positive and negative stiffness elements in response to a change in the variable load, while the variable stiffness structure supports the variable load.

In an embodiment, the positive stiffness element is configured to couple the variable load to an external body, and the negative stiffness element is configured to isolate vibrations of the variable load from the external body.

In an embodiment, the change in the variable load produces a displacement in the relative position of the variable load and the external body exceeding an operational range of displacement within which the negative stiffness element provides a negative stiffness constant to an aggregate stiffness constant of the variable stiffness structure, and, in response to the change in the variable load, the hydraulic system is configured to return the variable stiffness structure to the operational range of displacement by applying fluidic pressure to adjust the relative position of the positive and negative stiffness elements.

In an embodiment, the variable stiffness structure is configured to maintain a substantially constant stiffness as the relative position of the positive and negative stiffness elements is adjusted in response to a change in the variable load.

In an embodiment, the substantially constant stiffness is about zero stiffness.

In an embodiment, the positive stiffness element is configured to provide a positive stiffness constant to an aggregate stiffness constant of the variable stiffness structure.

In an embodiment, the hydraulic system includes an actuator and is configured to disengage the negative stiffness element prior to adjusting the relative position of the positive and negative stiffness elements, and to re-engage the negative stiffness element after the adjusting the relative position of the positive and negative stiffness elements.

In an embodiment, the hydraulic system includes: a hydraulic chamber coupled to the negative stiffness element; an accumulator; and a valve system configured to move fluid between the hydraulic chamber and the accumulator, wherein the hydraulic chamber is configured to exert fluidic pressure on the negative stiffness element to adjust the position of the negative stiffness element relative to the positive stiffness element, in response to the change in the variable load.

In an embodiment, the valve system is configured to increase or decrease the fluidic pressure inside the hydraulic chamber according to the change in the variable load.

In an embodiment, the valve system includes two or more pressure relief valves arranged in opposite directions and configured to permit flow of fluid between the hydraulic chamber and the accumulator, when a fluid pressure in either the hydraulic chamber or the accumulator exceeds a relief pressure.

In an embodiment, the two or more pressure relief valves include passive valves.

In an embodiment, the valve system includes one or more of a passive valve and an active valve.

In an embodiment, the hydraulic system includes: a first hydraulic chamber coupled between the negative stiffness element and the variable load; a second hydraulic chamber coupled between the negative stiffness element and a body; and a valve system configured to move fluid between the first hydraulic chamber and the second hydraulic chamber to adjust the position of the negative stiffness element relative to the positive stiffness element, in response to the change in the variable load.

In an embodiment, the valve system is configured to adjust the position of the negative stiffness element relative to the positive stiffness element by reducing a fluidic pressure bias between the first and second hydraulic chambers.

In an embodiment, the valve system includes one or more of a passive valve and an active valve.

In an embodiment, the variable stiffness structure further includes a sensor coupled to one of the first and second hydraulic chambers, wherein the sensor is configured to sense a fluid pressure inside one of the first and second hydraulic chambers, and wherein the valve system is further configured to control the stiffness of the negative stiffness element according to the sensed fluid pressure.

In an embodiment, the positive stiffness element includes a first rubber disc and a second rubber disc, and is coupled to the variable load through an inner post.

In an embodiment, the negative stiffness element includes a pair of buckled discs having a first end coupled to a body and a second end configured to slide along a length of the inner post.

In an embodiment, the stiffness of the NS element is controlled by an actuator coupled to the first end or second end of the negative stiffness element.

In an embodiment, the hydraulic system includes: a first hydraulic chamber between the first rubber disc and the negative stiffness element; a second hydraulic chamber between the first rubber disc and the negative stiffness element; and a valve system configured to move fluid between the first hydraulic chamber and the second hydraulic chamber to adjust the position of the negative stiffness element relative to the inner post, in response to the change in the variable load.

In an embodiment, a stiffness of the negative stiffness element remains substantially constant as the valve system adjusts the position of the negative stiffness element relative to the inner post.

In an embodiment, the hydraulic system includes: a first hydraulic chamber coupled between the negative stiffness element and the variable load; a second hydraulic chamber coupled between the negative stiffness element and a body; a first accumulator; and a valve system configured to move fluid between the first accumulator and the first and second hydraulic chambers, wherein the each of the first and second hydraulic chambers is configured to exert fluidic pressure on the negative stiffness element to adjust the position of the negative stiffness element relative to the positive stiffness element, in response to the change in the variable load.

In an embodiment, the valve system is configured to increase or decrease fluidic pressures inside the first and second hydraulic chambers according to the change in the variable load.

In an embodiment, the valve system is configured to balance fluidic pressures between the first and second hydraulic chambers according to the change in the variable load.

In an embodiment, the variable stiffness structure further includes a sensor coupled to one of the first and second hydraulic chambers, wherein the sensor is configured to sense a fluid pressure inside one of the first and second hydraulic chambers, and wherein the valve system is further configured to control the stiffness of the negative stiffness element according to the sensed fluid pressure.

In an embodiment, the hydraulic system further includes a first actuator configured to push fluid from one of the first and second hydraulic chambers into another one of the first and second hydraulic chambers.

In an embodiment, the hydraulic system further includes a second actuator configured to increase or decrease a fluidic pressure in the first accumulator.

In an embodiment, the hydraulic system further includes: a second accumulator, wherein the valve system is further configured to move fluid between the second accumulator and the first and second hydraulic chambers.

According to some embodiments of the present invention, there is provided an isolation system including: a body; a variable load; and a variable stiffness structure coupled to the body and the variable load and configured to isolate vibrations of the variable load from the body in presence of a change in the variable load, the variable stiffness structure including: a positive stiffness element coupled to the variable load; a negative stiffness element; and a hydraulic system coupled to the positive and negative stiffness elements and configured to adjust a relative position of the positive and negative stiffness elements in response to a change in the variable load, while the variable stiffness structure supports the variable load.

In an embodiment, the hydraulic system includes: a hydraulic chamber coupled to the negative stiffness element; an accumulator; and a valve system configured to move fluid between the hydraulic chamber and the accumulator, wherein the hydraulic chamber is configured to exert fluidic pressure on the negative stiffness element to adjust the position of the negative stiffness element relative to the positive stiffness element, in response to the change in the variable load.

In an embodiment, the hydraulic system includes: a first hydraulic chamber coupled between the negative stiffness element and the variable load; a second hydraulic chamber coupled between the negative stiffness element and the body; a valve system configured to move fluid between the first hydraulic chamber and the second hydraulic chamber to adjust the position of the negative stiffness element relative to the positive stiffness element, in response to the change in the variable load.

Accordingly, embodiments of the present invention are capable of maintaining low stiffness (i.e., high isolation) at mid to high vibrational frequencies while permitting large loads to pass through the isolation system.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present invention will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

In many mechanical structures, such as structures utilized in transportation systems, it is desirable to isolate broadband vibrations while being subjected to a wide range of static forces (e.g., g-loads). The present disclosure is directed to various embodiments of a largely passive system (e.g., a variable stiffness structure) capable of isolating vibrations while still supporting large static forces.

The variable stiffness structures of the present disclosure may be incorporated into any system or device in which it is desirable to prevent or at least reduce the transmission of vibration through the structure or device, such as, for instance, gyroscopes (wherein the accuracy of the gyroscope is proportional to the level of vibration isolation), passenger vehicles (e.g., vibration isolation between the engine and the chassis of the vehicle or between a wheel and the road), aircraft (e.g., vibration isolation between a helicopter blade and a hub of the helicopter), cameras (wherein vibration reduction may improve image quality), radar and other sensitive measurement equipment, precision targeting equipment (e.g., smart munitions targeting systems), sensitive medical equipment, satellites, and/or the like. Transmissibility is a measure of vibration isolation quality and is defined as the ratio of the response amplitude of the isolated system or device to the excitation amplitude input into the system or device (i.e., the excitation amplitude is the force or displacement that the variable stiffness structures of the present disclosure are configured to prevent or at least reduce from being transmitted to a vibration-sensitive structure).

In conventional dynamic systems it is often difficult to account for large variations in static force (e.g., "DC offset" in load). "DC offset" in load refers to any load change where the frequency component of the change is less than ⅕ of the natural frequency of the overall system. Embodiments of the present invention are directed toward a hydraulic isolator with quasi-zero-stiffness (QZS) stiffness capable of isolating low-amplitude vibrations while allowing large variations in static force.

In some embodiments, low stiffness (e.g., high isolation) is maintained at mid to high frequencies while permitting DC loads to pass through the network by utilizing a nearly passive network to reduce (e.g., minimize) the power used by the system. According to an embodiment, the hydraulic isolation system combines a controllable negative stiffness element with a hydraulic system, which provides a continuously variable adjustment of the connectivity between the negative stiffness element and some external positive stiffness system, to account for variations in static force through the negative stiffness element. According to another embodiment, compression in a passive negative stiffness element is maintained while the system is adjusted in response to variations in static force. Accordingly, embodiments of the present invention achieve wide bandwidth isolation with high static (e.g., "DC") stiffness and reduced (e.g., minimal) applied power.

Figure 1A:
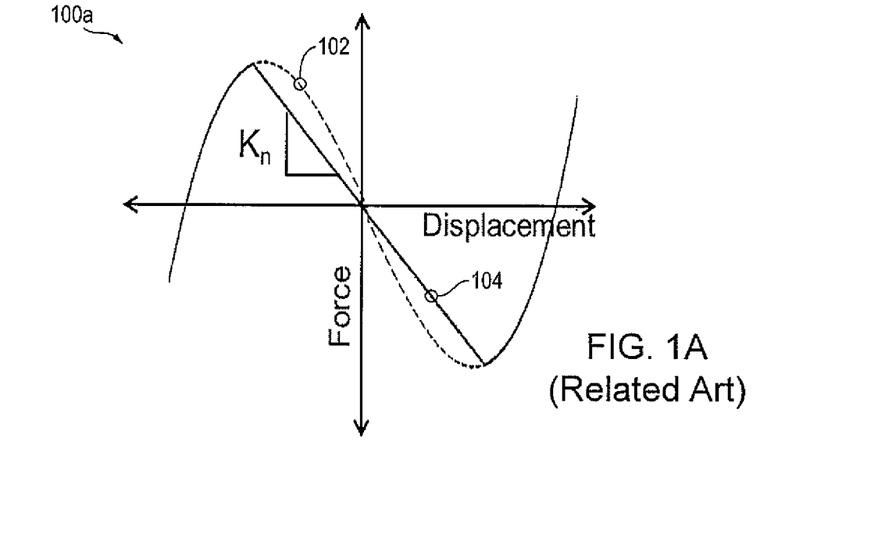
FIG. 1A illustrates a force-displacement relationship 100a for a negative stiffness element.
Figure 1B:
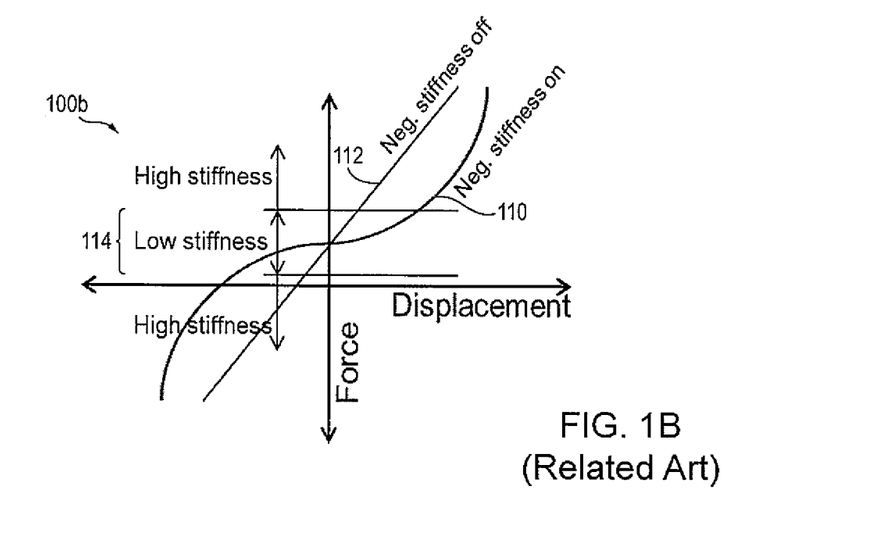
FIG. 1B illustrates the force-displacement relationship 100b for a generic quasi-zero-stiffness (QZS) spring system including a negative stiffness element and positive stiffness element.

FIG. 1A illustrates a force-displacement relationship 100a for a negative stiffness element. FIG. 1B illustrates the force-displacement relationship 100b for a generic quasi-zero-stiffness (QZS) spring system including a negative stiffness element and positive stiffness element.

Negative stiffness structures are structures that are in some unstable state, for example, in a state of buckling or collapse. Some examples are a buckled beam or an over-center toggle mechanism. Outside a critical displacement, the stiffness of the structure is positive, but within the critical range, stiffness is negative (represented by $K_n$ in FIG. 1A). The negative stiffness may take any shape, but generally lies between a cubic (e.g., the dotted-line curve 102) and linear (e.g., the solid-line curve 104) relationship with respect to displacement, as shown in FIG. 1A. When a negative stiffness structure is coupled in parallel with a positive stiffness structure (e.g., a spring having a linear force-displacement relationship represented by curve 112), the system may stabilize into a nonlinear quasi-zero-stiffness (QZS) system, exhibiting low stiffness within a limited force range 114, and high stiffness outside of that range, as illustrated by curve 110 in FIG. 1B. Such a passive system is useful in applications where the average force stays within the "low stiffness" range, and the relationship between vibration amplitude and frequency is fixed. Examples may include machines or equipment operating on the ground or a fixed surface.

For systems with a changing vibration spectrum or additional environmental loads and accelerations, an adaptive negative stiffness component may be controlled (e.g., adjusted) to assume any stiffness between the positive stiffness spring (e.g., curve 112) and nearly zero stiffness (e.g., near center portion of curve 110). While this may be useful in situations where the static force is small and of limited duration, when the low frequency or quasi-static force is large and more prolonged the load may operate away from the low stiffness portion of the force displacement curve 110, thus passing more vibration through the network.

Figure 2:
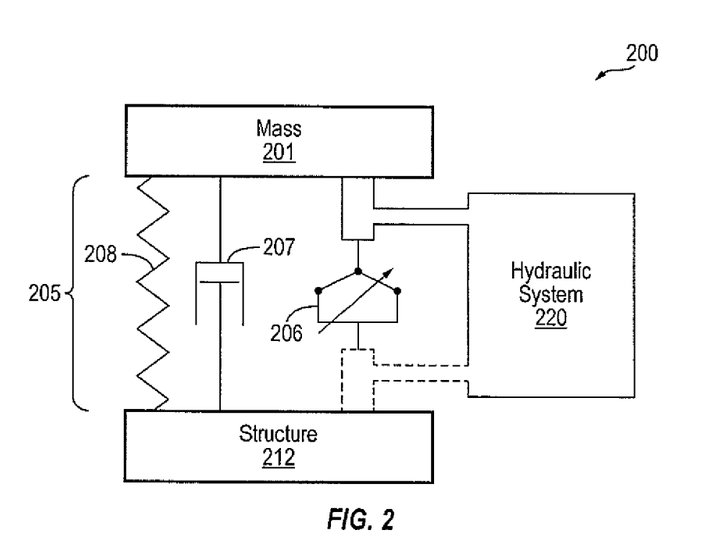
FIG. 2 is a functional representation of a hydraulic isolation system, according to an illustrative embodiment of the present invention.

FIG. 2 is functional representation of a hydraulic isolation system (e.g., a hydraulic QZS system or hydraulically coupled negative stiffness system) 200, according to an illustrative embodiment of the present invention. The isolation system 200 includes a mass (e.g., a variable load) 201, a structure (e.g., a body) 212, and a mount 205 for protecting (e.g., isolating) the mass 201 from the motion of the structure 212 (as may be the case in, e.g., a camera mount), for protecting (e.g., isolating) the structure 212 from a vibrating mass 201, or, in some instances for protecting both (e.g. in engine mounts). The mount 205 may be represented, in part, as, a damper element 207, and a positive stiffness element (e.g., positive stiffness spring or static stiffness element) 208. The damper element 207 and the positive stiffness (PS) element 208 represent the dissipation and load-supporting properties, respectively, of the mount 205, and may, for example, be a viscous damper and a coil spring, or a solid piece of rubber. The damper 207 and the positive stiffness element 208 shown in FIG. 2 are those of a simple single-degree of freedom network, which may be translational or torsional. However, embodiments of the present invention are not limited thereto, and the spring and damper combination shown may be replaced with a more complex positive-stiffness system.

In an embodiment, the mount 205 further includes a negative stiffness element (e.g., a variable negative stiffness) 206 and a hydraulic system (e.g., hydraulic clutching mechanism) 220. Without the hydraulic system 220, the negative stiffness (NS) element 206 allows the isolation system 200 to exhibit any stiffness between zero and that of the PS element 208, provided that the static force exerted in the mount 205 remains substantially constant (e.g., within the low stiffness range 114 of FIG. 1B). However, according to embodiments of the present invention, in the event of large static force offsets (e.g., offsets that would cause the isolation system 200 to fall out of the low stiffness range 114 of FIG. 1B), the hydraulic system 220 provides the isolation system 200 with a low-energy mechanism for adjusting the range (in force or displacement) of the NS element 206 to compensate for a static force offset. In FIG. 2, the NS element 206 is schematically shown as a simple beam pinned at each end. However, the NS element 206 is not limited thereto and may include any complex negative element, such as a Belleville washer, buckling beam or column, higher-mode (2, 3) buckling beam, a buckling disc, a multi-link mechanism, and/or the like. The hydraulic system 220 may be single-sided, i.e., coupled between only one end of the NS element 206 and a corresponding one of the mass 201 and the structure 212, or the hydraulic system 220 may be dual-sided, i.e., coupled to both ends of the NS element 206 separating it on both ends from the mass 201 and the structure 212 (e.g., as shown by the dotted end of the hydraulic system 220 in FIG. 2).

Figure 3A:
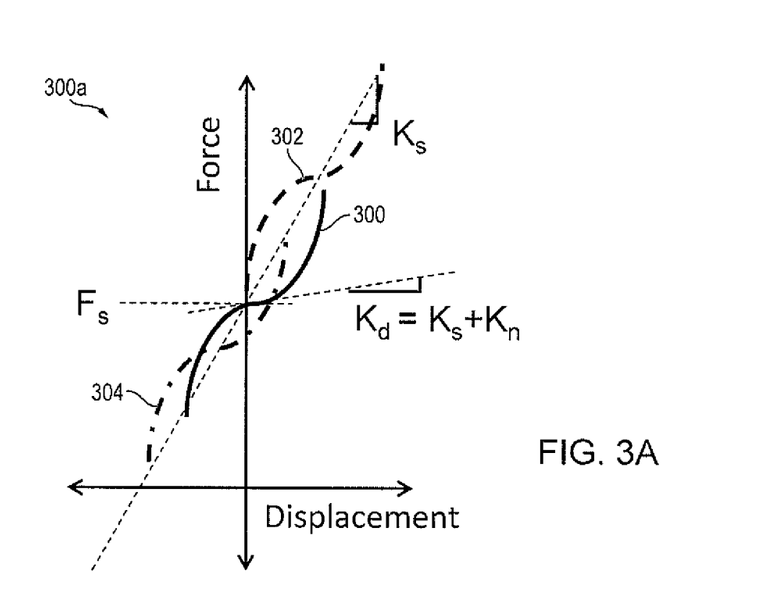
FIGS. 3A and 3B illustrate the concept of re-adjusting the connectivity of a negative stiffness element in an adaptive quasi-zero-stiffness (QZS) system to maintain the low-stiffness region at a current static force, according to illustrative embodiments of the present invention.
Figure 3B:
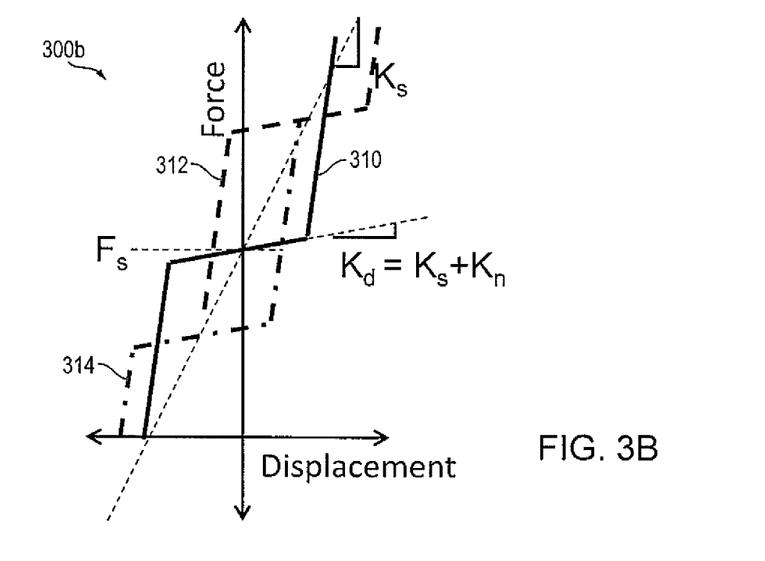

FIGS. 3A and 3B illustrate the concept of re-adjusting the connectivity of a negative stiffness element in an adaptive quasi-zero-stiffness (QZS) system to maintain the low-stiffness region at a current static force, according to illustrative embodiments of the present invention. FIG. 3A illustrates the force-displacement relationship of an adaptive QZS system having a cubic negative stiffness element (such as shown by curve 102 of FIG. 1A), according to an illustrative embodiment of the present invention. FIG. 3B illustrates the force-displacement relationship of an adaptive QZS system having a linear negative stiffness element (such as shown by curve 104 of FIG. 1B), according to an illustrative embodiment of the present invention.

In FIGS. 3A and 3B, curves 300a and 300b represent the baseline force-displacement relationship of the adaptive QZS system, according to embodiments of the present invention. The effective (or aggregate) low stiffness is given by $K_d$ that is the sum of the static stiffness $K_s$ (which stabilizes the system and supports the static load, $F_s$) and negative stiffness $K_n$ over the range of displacement where the negative element provides a negative stiffness constant. When the static force $F_s$ changes (e.g., due to additional mass or inertial loads effects), the adaptive QZS system alters the relative position between negative and positive stiffness springs to adjust the region of low stiffness to match a new value of $F_s$. Curves 302, 304, 312, and 314 represent examples of other force-displacement relationships that the adaptive QZS system may assume by changing the relative displacement of the negative and positive elements of the system. As shown in FIGS. 3A and 3B, the adjustment creates a system with high effective static stiffness for variable low frequency loads, and simultaneously or concurrently low dynamic stiffness for higher frequency vibratory loads.

Figure 4A:
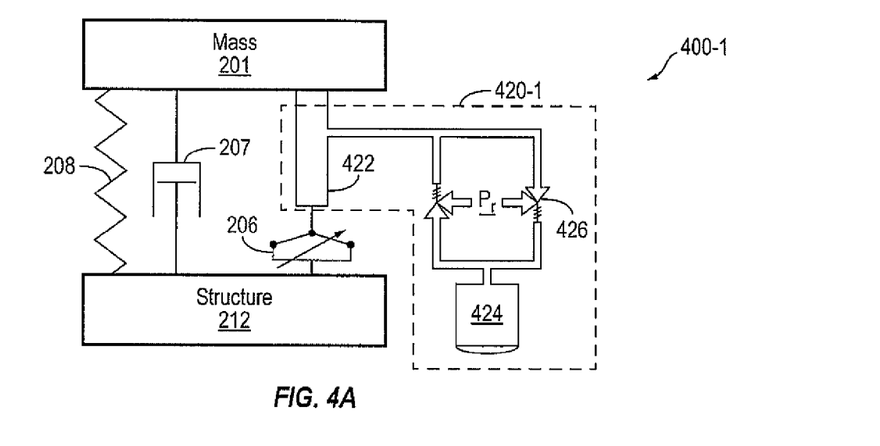
FIG. 4A is a functional representation of a hydraulic isolation system utilizing a single-sided, passive, low-pressure hydraulic system, according to an illustrative embodiment of the present invention.
Figure 4B:
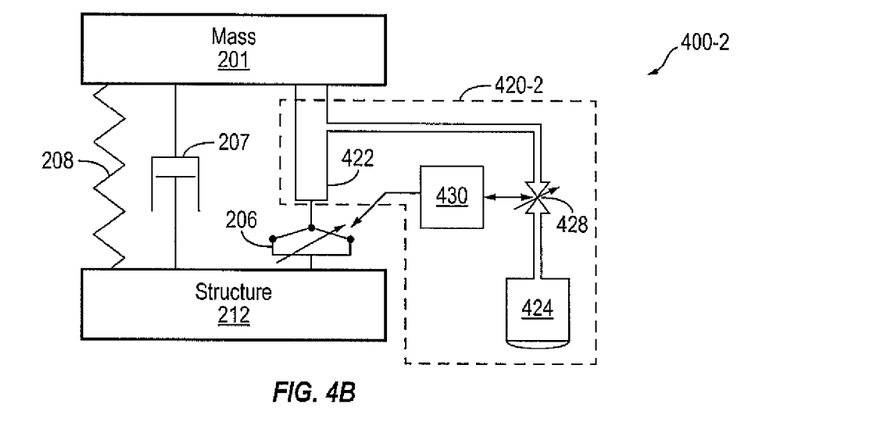
FIG. 4B is a functional representation of a hydraulic isolation system utilizing a single-sided, active, low-pressure hydraulic system, according to an illustrative embodiment of the present invention.
Figure 4C:
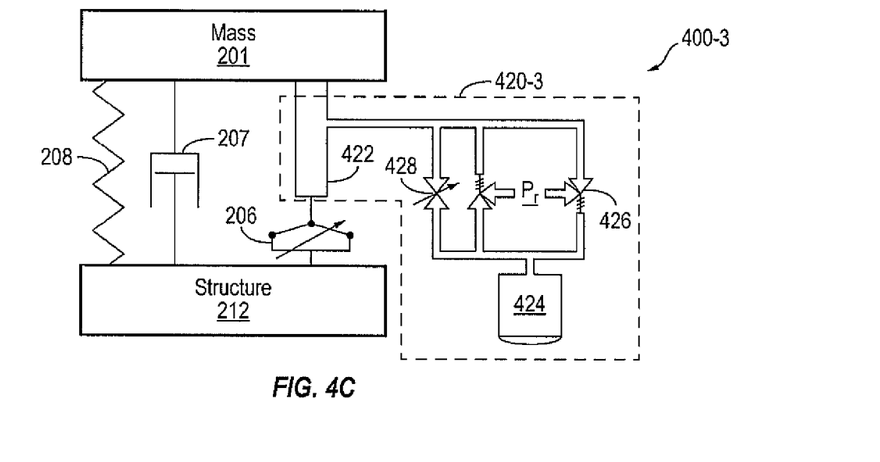
FIG. 4C is a functional representation of a hydraulic isolation system utilizing a single-sided, hybrid low-pressure hydraulic system having both active and passive valves, according to an illustrative embodiment of the present invention.

FIGS. 4A-4C are functional representations of single-sided hydraulic isolation systems (e.g., single-sided hydraulically coupled NS systems) 400-1 to 400-3 for static and dynamic load filtering, according to illustrative embodiments of the present invention.

FIG. 4A is a functional representation of a hydraulic isolation system 400-1 utilizing a single-sided, passive, low pressure hydraulic system 420-1, according to an illustrative embodiment of the present invention. A low-pressure system may be one in which hydraulic fluid is allowed to have a pressure below atmospheric pressure. In an embodiment, mass 201 is coupled to a structure (e.g., a body) 212 through a positive stiffness (PS) element (e.g., a positive spring) 208 and damper 207. While the damper 207 and PS element 208 represent a simple single-degree of freedom network, such as a steel or rubber structure, embodiments of the present invention are not limited thereto and the damper/PS element combination may be replaced with any more complex positive stiffness system. The negative stiffness (NS) element (e.g., a controllable negative stiffness spring) 206 is coupled in parallel with the PS element.

In an embodiment, the NS element 206 is coupled to (e.g., rigidly coupled to) the structure 212 on one end as is coupled to a hydraulic chamber (e.g., a hydraulic column) 422 of a hydraulic system 420-1 on another end. The mass 201 is coupled to (e.g., affixed to) the hydraulic chamber 422, which may have a fixed volume, constraining the mass 201 to be coupled to the NS element 206. In an alternative embodiment, the NS element 206 is coupled to (e.g., rigidly coupled to) the mass 201 and the hydraulic chamber 422 is coupled between the NS element 206 and the structure 212.

In an embodiment, the hydraulic chamber 422 is coupled to a low pressure (e.g., below atmospheric pressure) hydraulic accumulator (e.g., fluid reservoir) 424 through a passive valve system 426. In an example, the hydraulic accumulator 424 may be held at substantially zero pressure or at an other low pressure.

In an embodiment, the hydraulic fluid includes glycol, esters, organophosphate ester, polyalphaolefin, propylene glycol, silicone oils, and/or the like. For example, the hydraulic fluid includes oils, butanol, esters (e.g. phthalates, such as DEHP, and adipates, such as bis(2-ethylhexyl) adipate), polyalkylene glycols(PAG), organophosphate (e.g. tributylphosphate), silicones, alkylated aromatic hydrocarbons, polyalphaolefins (e.g. polyisobutenes), corrosion inhibitors (including acid scavengers), anti-erosion additives, and/or the like.

According to an embodiment of the present invention, each time the static force exerted by the load or mass 201 changes beyond a threshold (e.g., a predetermined threshold), the isolation system 400-1 responds to the change by increasing or decreasing the volume of fluid inside the hydraulic chamber 422. The isolation system 400-1 may detect the change in the static force in a number of ways, including determining whether the displacement of the NS element 206 exceeds a threshold (above or below its midpoint) for a length of time (e.g., a preset length of time), determining whether pressure within the hydraulic system 420-1 (e.g., within the hydraulic chamber 422) exceeds a threshold (e.g., a preset threshold) for a length of time, determining whether a force detected by a sensor (e.g., a transducer) between the NS element 206 and the structure 212 exceeds a threshold (above or below zero) for a length of time, and/or the like.

The time component of the measurements may allow the isolation system 400-1 to filter out sudden shocks. Depending on the application of the hydraulic isolation system 400-1, the length of time may vary from zero seconds to several minutes. The time component of the measurements may be implemented by, for example, a digital filter (e.g., when a microprocessor controls the system), an analog filter across the sensor signal (such as a capacitor across the output of a transducer), or a physical filter (such as a restricted flow to a pressure transducer).

In an embodiment, following the detection of a change in the static force, the isolation system 400-1 may readjust (e.g., reset) itself to the new force level by, for example, re-centering the NS element 206. In so doing, the isolation system 400-1 may disengage (e.g., release) the NS element 206 (giving the NS element 206 zero or slightly positive stiffness), equalize pressure in the hydraulic system 420-1 (e.g., equalize pressure between the hydraulic chamber 422 and the accumulator 424) to, for example, atmospheric pressure, and then re-engage the NS element 206. Thus, in an embodiment, the hydraulic isolation system 400-1 repositions the NS element 206 both in terms of force and position.

In an embodiment, the engaging/disengaging of the NS element 206 is performed by one or more actuators coupled to (e.g., operatively coupled to) the NS element 206. The one or more actuators may also control the stiffness of the NS element, and may be located at any suitable position (e.g., at an end of the NS element) between the NS element 206 and the mass 201 or the NS element 206 and the structure 212.

According to an embodiment of the present invention, two or more pressure relief valves (e.g., passive pressure relief valves) 426 are arranged in opposite directions and are configured to permit flow of fluid (in opposite directions) between the hydraulic chamber 422 and the accumulator 424 when the fluid pressure exceeds a relief pressure Pr. The value of the relief pressure Pr is dependent on the application of the hydraulic isolation system 400-1, which may be supporting anything from a single instrument to an entire aircraft. In an embodiment, the relief pressure Pr is greater than the maximum force generated by the negative stiffness element 206 (e.g., half of the peak-to-peak force magnitude shown FIG. 1A) divided by the hydraulic column area (e.g., area of the hydraulic column 422). In an embodiment, the isolation system 400-1 senses when one or more of the pressure relief valves are opening and resets the NS element 206 by, for example, disengaging (e.g., releasing) the NS element 206 and returning the NS element 206 to its neutral position (e.g., its original centered position, when the variable load or mass 201 is substantially constant) while the one or more pressure relief valves 426 are still open. Once the NS element 206 is reengaged and the one or more pressure relief valves close, the negative stiffness of the isolation system 400-1 (e.g., the NS element 206) is increased. In an example, this process may happen quickly and "quasi continuously" because the NS element 206 may be engaged and disengaged rapidly. In an example, the rapid adjustment may occur at about 2 Hz; however, this may occur as fast as 100 Hz. The relief pressure (and hence the tolerated relief pressure delta) may be set according to the stable displacement range of the NS element 206 (e.g., the displacement range corresponding to the low stiffness range 114 of FIG. 1B) and the pressure differential range of the negative element, which may be at or above the maximum force generated by the negative stiffness element 206 (e.g., half of the peak-to-peak force magnitude shown FIG. 1A) divided by the area of the hydraulic column 422.

FIG. 4B is a functional representation of a hydraulic isolation system 400-2 utilizing a single-sided, active, low-pressure hydraulic system 420-2, according to an illustrative embodiment of the present invention.

The isolation system 400-2 illustrated in FIG. 4B is substantially similar to the isolation system 400-1 described above with respect to FIG. 4A, with the exception that the hydraulic isolation system 400-2 utilizes an active hydraulic system, instead of a passive one.

In an embodiment, the hydraulic isolation system 400-2 performs the same engage/release procedure described above, however, the timing of the opening/closing of the active one or more pressure relief valves 428 and the engagement/disengagement of the NS element 206 is directly controlled by a control unit 430, which responds to a load/mass 201 change as described above with respect to FIG. 4A. While the one or more pressure relief valves 428 are active, the fluid pressure of the hydraulic system 420-2 is still driven by the load/mass 201 and pumps may not be needed to maintain pressure in the accumulator 424. The accumulator 424 may be a high-pressure accumulator (e.g., a reservoir having fluid pressure higher than an atmosphere).

FIG. 4C is a functional representation of a hydraulic isolation system 400-3 utilizing a single-sided, hybrid low pressure hydraulic system 420-3 having both active and passive valves 426 and 428, according to an illustrative embodiment of the present invention.

The elements utilized in the isolation system 400-3 illustrated in FIG. 4B are substantially similar to those of the isolation systems 400-1 and 400-2 described above with respect to FIGS. 4A-4B, and a description of the elements and their operation may not be repeated.

According to an embodiment, the active valve 428 may handle lower static load changes (which may entail low fluid velocities), while the passive valves 426 may be used to adjust for higher static load changes. For example, the active valve 428 may be triggered at static loads at or below twice the maximum negative stiffness force (i.e., the maximum force generated by the negative stiffness element 20 or the peak-to-peak force magnitude shown FIG. 1A), while the passive valve 428 may be triggered at static loads greater than twice the maximum negative stiffness force.

In an embodiment, the relief pressure of the passive valve 426 is set to correspond to a force higher than the maximum negative stiffness force to force, to ensure that the passive valve 426 only opens when the system is stable. If a valve opens while the hydraulic isolation system 400-3 is in an unstable region (between the force peaks, as shown in FIG. 1A, or in the low stiffness region 114) then the negative stiffness element 206 may snap through and all isolating properties may be lost until the system 400-3 is reset. The active valve 428 may ensure that the system 400-2 operates in a stable region (e.g., at close to zero stiffness) and prevent the system 400-2 opening a valve in an unstable region.

Figure 5:
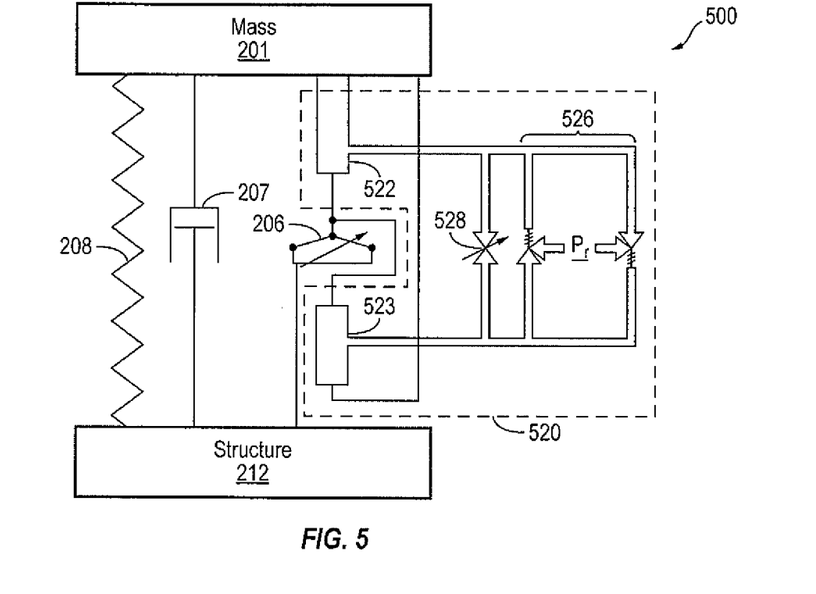
FIG. 5 is a schematic diagram of a hydraulic isolation system utilizing a dual-sided, hybrid, high-pressure hydraulic system, according to an illustrative embodiment of the present invention.

FIG. 5 is a schematic diagram of a hydraulic isolation system 500 utilizing a dual-sided, hybrid, high-pressure hydraulic system 520, according to an illustrative embodiment of the present invention.

The dual-sided hydraulic isolation system 500 illustrated in FIG. 5 is similar to the single-sided isolation systems 400-1 to 400-3 described above with respect to FIGS. 4A-4C, with the exception that the isolation system 500 utilizes a higher pressure system 520 to accommodate larger forces (e.g., larger load/mass 201 change) as compared to the embodiments of single-sided isolation systems 400-1 to 400-3.

According to an embodiment, instead of a hydraulic accumulator (e.g., a fluid reservoir), the dual-sided isolation system 500 includes a second hydraulic chamber (e.g., a hydraulic column) 523 at another end (e.g., the lower side) of the NS element 206. In an embodiment, a positive pressure bias across the two hydraulic chambers 522 and 523 reduces (e.g., prevents) cavitation and allows the isolation system to adjust to higher forces (as compared to a single-sided isolation system) from the NS element 206 that may be pulling on the fluid chamber. Rather than couple the upper hydraulic chamber 522 to an accumulator, in an embodiment, the chamber 522 is coupled to the lower hydraulic chamber 523, and the isolation system moves (e.g., shuttles) fluid between the upper and lower chambers 522 and 523 to maintain the compressive force of the NS element 206 while allowing the supported mass/load 201 or the structure (e.g., a body) 212 to displace against the PS element 208.

In an embodiment, the isolation system 500 adjusts (e.g., adapts) to a change in the static force (e.g., resulting from a change in the load/mass 201) by disengaging the NS element 206 from the mass 201, equalizing hydraulic pressure in the hydraulic system 520, and reengaging the NS element 206, in substantially the same manner as that described above with respect to FIGS. 4A and 4B.

While FIG. 5 depicts a hybrid hydraulic system including an active pressure relief valve 524 and a passive pressure relief valve 526, in some embodiments of the present invention, the hydraulic system may not include either the passive valve 526 or the active valve 528.

Figure 6:
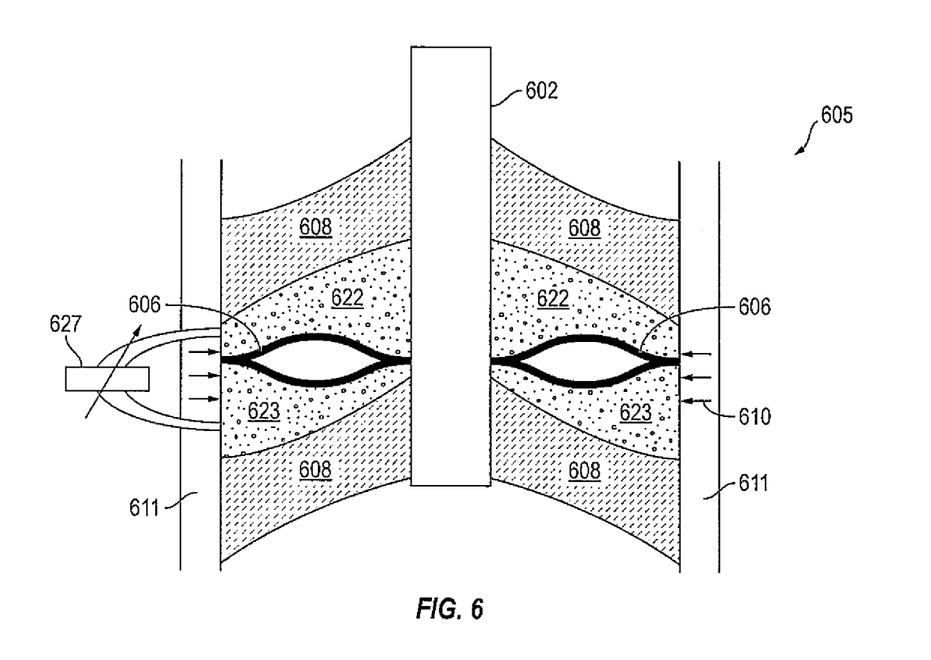
FIG. 6 is a schematic diagram of a mount in a hydraulic isolation system utilizing a dual-sided, hydraulic system, according to an illustrative embodiment of the present invention.

FIG. 6 is a schematic diagram of a mount 605 of an isolation system utilizing a dual-sided, hydraulic system, according to an illustrative embodiment of the present invention.

In an embodiment, the dual-sided isolation system includes a mount 605 for supporting a load/mass 201 that is coupled to (e.g., affixed) the mount 605 through a post (e.g. a rigid inner post or central shaft) 602. The mount 605 may be coupled to the structure (e.g., a body) through the sides (e.g., the left and right sides) of the mount housing 611 and serves to reduce (e.g., prevent) vibration transmission between the mass/load and the structure. In an embodiment, the mount 605 includes upper and lower hydraulic chambers (e.g., first and second chambers or hydraulic columns) 622 and 623 and a DC offset valve 627, which may include an active and/or passive pressure relief valve as described above with respect to FIGS. 4A-4C and 5. The DC offset valve 627 serves to equalize fluid pressure in the upper and lower chambers 622 and 623 by allowing the transfer of fluid between the two chambers 622 and 623 when the pressure differential of the two chambers 622 and 623 exceeds a threshold. In an embodiment, the threshold may be a pressure corresponding to a force at or greater than the maximum Negative stiffness force and below five times the maximum negative stiffness force. In an embodiment, the pressure is each chamber is monitored by a pressure sensor, which may be positioned in the chamber.

In an embodiment, a high-stiffness element (e.g., a high-stiffness rubber mount) 608 acts as both the positive stiffness element and the damper and may include a pair of rubber discs, and may be coupled, at the center, to the post 602 and, at the outer boundary, to the mount housing 611. The NS element 606 may include a pair of buckled discs and may be coupled to (e.g., anchored to) the structure through the mount housing 611 on one end (e.g., the base), while the other end of the NS element 606 may float freely between the hydraulic chambers 622 and 623 and not be attached to the rigid post 602. In an example, the floating end of the NS element 606 is configured to slide along the length of the post 602 via, for example, an O-ring or another fluid seal device. In an embodiment, each of the upper and lower hydraulic chambers 622 and 623 includes a cavity formed between one side of the high-stiffness element 608 and a corresponding side of the NS element 206. Thus, one side of each of the upper and lower hydraulic chambers 622 and 623 may be coupled to (e.g., rigidly coupled to) the load/mass 201 through the high-stiffness element 608.

The stiffness of the NS element 606 may be controlled by an actuator 610 coupled (e.g., operatively coupled) between the base of the NS element 606 and the structure.

Figure 7:
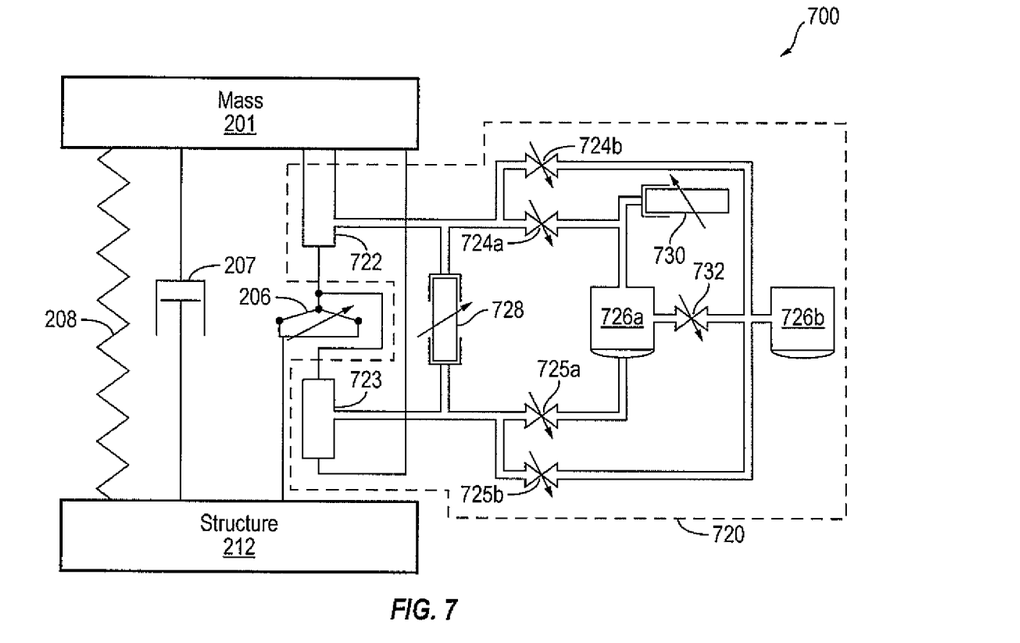
FIG. 7 is a schematic diagram of a dual-sided hydraulic isolation system for adjusting connectivity of a negative stiffness element without altering the negative stiffness value, according to an illustrative embodiment of the present invention.

FIG. 7 is a schematic diagram of a dual-sided hydraulic isolation system 700 for adjusting connectivity of a negative stiffness element without altering the stiffness of the NS element, according to an illustrative embodiment of the present invention.

The dual-sided hydraulic isolation system 700 illustrated in FIG. 7 is similar to the single-sided isolation systems 400-1 to 400-3 and the dual-sided isolation system 500, described above with respect to FIGS. 4A-4C and FIG. 5, respectively, and includes similar elements, descriptions of which may not be repeated here.

According to some embodiments, the dual-sided hydraulic isolation system 700 utilizes a hydraulic system 720 capable of responding to static force imbalance without altering the stiffness of the NS element 206, by simply adjusting the position of the NS element 206 relative to the mass/load 201 by the desired amount.

The hydraulic system 720 includes a first and second hydraulic chambers (first and second hydraulic columns) 722 and 723, each coupled to one or more of a high-pressure accumulator (e.g., a high-pressure reservoir) 726a and a low-pressure high-pressure (e.g., a low-pressure reservoir) 726b through two or more of valves (e.g., controllable one-way valves) 724a-b and 725a-b. Each of the valves 724a-b and 725a-b may be controlled to operate in three states: closed (e.g., OFF), open (ON) and allowing flow in one direction, and open (ON) and allowing flow in the opposite direction. The hydraulic system 720 may further include a first actuator 728, which may concurrently (e.g., simultaneously) push/pull on hydraulic chambers 722 and 723 (e.g., draw fluid from one the hydraulic chamber and push into the other), and a second actuator 730, which may be utilized to raise or lower the pressure in the high-pressure accumulator 726a. In an embodiment, the actuator 728 may include two or more antagonistic pistons for pushing in opposite directions, thus achieving a push/pull effect.

The hydraulic system 720 is inactive ("locked down") whenever the isolation system 700 is properly adjusted (e.g., there is no static imbalance) and the NS element 206 is oscillating about its neutral position (e.g., centered position or fully compressed state).

In the event of a static force imbalance, the hydraulic system 720 may detect the imbalance by utilizing one or more pressure sensors in the first and second hydraulic chambers 722 and 723, a displacement sensor on the NS element 206, and/or the like. In an embodiment, the NS element 206 may be actively driven back to its centered position by one or more of the first and second actuators 728 and 730. According to an embodiment (e.g., a "high-force" system), valve 724a equalizes pressure between hydraulic chambers 722 and 723, and then closes. Next, the first actuator 728 may push sufficient amount of fluid from the first hydraulic chamber 722 to the second hydraulic chamber 723 (or vice versa) to return the NS element 206 to its neutral position. In an embodiment in which the NS element 206 rests against a "hard stop" when out of balance, the throw of the first actuator 728 is fixed, and a solenoid may be used as the actuator. However, embodiments of the present invention are not limited thereto and any other actuator may be used (utilized), including pumps, motors, servo motors, shape memory actuators, pneumatic actuators, or the like. According to an embodiment (e.g., a "low-force" system), the second actuator 730 may be used (utilized) in lieu of, or in addition to, the first actuator 728 to bring the NS element 206 to its neutral position (while valve 724a is open).

According to some embodiments of the present invention, the hydraulic system 720 adjusts the NS element 206 to a neutral position without any external energy (to move hydraulic fluid) by storing pressure from the DC offset or system vibration in accumulator 726a, and then using the stored pressure in a controlled manner to return the NS element 206 to a neutral position. Initially, the accumulator 726a may be at a low pressure. In an example, the accumulator 726a may be equalized to the pressure in accumulator 726b though valve 732. When the NS element 206 is detected as out of position with a high pressure in one of hydraulic chambers 722 and 723, a valve 724a or 725a may open to transfer this pressure to accumulator 726a. Once the pressure inside the accumulator 726a reaches a threshold pressure, valve 724a or 725b may close, and valve 724b or 725b may equalize the pressure in the hydraulic chambers 723 and 724 to a low pressure, and then close. Finally, the NS element 206 may be pushed back to a neutral position by again opening valve 724a or 725a and the opposite low-pressure valve 724b or 725b, using the pressure stored in accumulator 726a to overcome the negative stiffness of NS element 206. Valves 724a-b and 725a-b may be closed when the neutral position is reached.

In the event of only minor (or moderate) changes in static force, there may not be enough built-up pressure in the hydraulic chamber 722/723 to sufficiently charge the accumulator 726a. To add further robustness to the hydraulic system 720, the second actuator 730 may be utilized to increase the pressure inside the accumulator 726a to compensate for insufficient pressure buildup in the hydraulic chamber 722/723. In addition to, or in lieu of, the second actuator 730, the first actuator 728 may be used (utilized) to perform substantially the same function as the accumulator 726a when there is insufficient pressure in the hydraulic chamber 722/723.

In an embodiment, one or more of the first and second actuators 728 and 730 may be coupled to a large related art pressurized hydraulic or pneumatic system to provide faster and/or more precise response to any static force imbalance. In an example, a position sensor may detect the position of the NS element 206, and a servo-valve (using system pressure) may drive the NS element 206 to its neutral position. A closed-loop control system, such as one described above, may be sufficient to maintain isolation, and the actuators 728 and/or 730 may only move at the rate of the low-frequency load change (e.g., static load change).

According to some embodiments of the present invention, the hydraulic fluid may be incompressible (i.e., its volume remains substantially constant as pressure varies). However, embodiments of the present invention are not limited thereto and may, instead, include a suitable compressible fluid.

In embodiments of the present invention, the hydraulic isolation system may include one or more actuators of any suitable kind, such as, active materials (e.g., piezoelectric materials, shape memory alloys, magnetostrictive materials, electro-active polymers, and dielectric elastomers), servo motors, stepper motors, solenoids, ultrasonic drives, voice coils, hydraulics, wedges, levers, tapered shafts, and/or the like.

According to some embodiments of the present invention, one or more sensors are configured to measure or detect one or more conditions of the hydraulic isolation system, such as, for instance, a position of the isolated mass/load, a position of the one or more stiffness elements (e.g., NS and/or PS elements), strain on the one or more stiffness elements, fluid pressure inside the one or more hydraulic chambers, the temperature of the hydraulic isolation system, and/or the like. Additionally, the one or more sensors may be configured to detect and/or measure one or more conditions of the structure or system into which the hydraulic isolation system is integrated. For instance, in an embodiment in which the hydraulic isolation system is incorporatd in a vehicle, the one or more sensors may be configured to collect external information such as, engine revolutions per minute (RPMs), velocity, braking, steering inputs and/or the like. The one or more sensors may be any kind of sensors suitable for detecting and/or measuring the relevant conditions of the NS clutch system, such as, position sensors (e.g., linear variable differential transformer (LVDT) sensors, optical sensors, and/or laser-based sensors), strain sensors, load cells (e.g., strain gauges in a Wheatstone bridge configuration) to provide load information for the one or more stiffness elements (e.g., NS and/or PS elements), a temperature sensor to compensate for thermal effects, and/or the like. The one or more sensors may be configured to send one or more signals to a control system, which drives the actuators to expand or contract based upon the one or more input signals from the one or more sensors.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to or "connected" to another component, it can be directly attached to the other component or intervening components may be present therebetween.

What is claimed is:

1. A variable stiffness structure configured to support a variable load, the variable stiffness structure comprising:
   a positive stiffness element coupled to the variable load;
   a negative stiffness element; and
   a hydraulic system coupled to the positive and negative stiffness elements and configured to adjust a relative position of the positive and negative stiffness elements in response to a change in the variable load, while the variable stiffness structure supports the variable load.

2. The variable stiffness structure according to claim 1, wherein the positive stiffness element is configured to couple the variable load to an external body, and
   wherein the negative stiffness element is configured to isolate vibrations of the variable load from the external body.

3. The variable stiffness structure according to claim 2,
   wherein the change in the variable load produces a displacement in the relative position of the variable load and the external body exceeding an operational range of displacement within which the negative stiffness element provides a negative stiffness constant to an aggregate stiffness constant of the variable stiffness structure, and
   wherein, in response to the change in the variable load, the hydraulic system is configured to return the variable stiffness structure to the operational range of displacement by applying fluidic pressure to adjust the relative position of the positive and negative stiffness elements.

4. The variable stiffness structure according to claim 1, wherein the variable stiffness structure is configured to maintain a substantially constant stiffness as the relative position of the positive and negative stiffness elements is adjusted in response to a change in the variable load.

5. The variable stiffness structure according to claim 1, wherein the positive stiffness element is configured to provide a positive stiffness constant to an aggregate stiffness constant of the variable stiffness structure.

6. The variable stiffness structure according to claim 1, wherein the hydraulic system comprises an actuator and is configured to disengage the negative stiffness element prior to adjusting the relative position of the positive and negative stiffness elements, and to re-engage the negative stiffness element after the adjusting the relative position of the positive and negative stiffness elements.

7. The variable stiffness structure according to claim 1, wherein the hydraulic system comprises:
   a hydraulic chamber coupled to the negative stiffness element;
   an accumulator; and
   a valve system configured to move fluid between the hydraulic chamber and the accumulator,
   wherein the hydraulic chamber is configured to exert fluidic pressure on the negative stiffness element to adjust the position of the negative stiffness element relative to the positive stiffness element, in response to the change in the variable load.

8. The variable stiffness structure according to claim 7, wherein the valve system is configured to increase or decrease the fluidic pressure inside the hydraulic chamber according to the change in the variable load.

9. The variable stiffness structure according to claim 7, wherein the valve system comprises two or more pressure relief valves arranged in opposite directions and configured to permit flow of fluid between the hydraulic chamber and the accumulator, when a fluid pressure in either the hydraulic chamber or the accumulator exceeds a relief pressure.

10. The variable stiffness structure according to claim 9, wherein the two or more pressure relief valves comprise passive valves.

11. The variable stiffness structure according to claim 7, wherein the valve system comprises one or more of a passive valve and an active valve.

12. The variable stiffness structure according to claim 1, wherein the hydraulic system comprises:
   a first hydraulic chamber coupled between the negative stiffness element and the variable load;
   a second hydraulic chamber coupled between the negative stiffness element and a body; and
   a valve system configured to move fluid between the first hydraulic chamber and the second hydraulic chamber to adjust the position of the negative stiffness element relative to the positive stiffness element, in response to the change in the variable load.

13. The variable stiffness structure according to claim 1, wherein the positive stiffness element comprises a first rubber disc and a second rubber disc, and is coupled to the variable load through an inner post.

14. The variable stiffness structure according to claim 13, wherein the negative stiffness element comprises a pair of buckled discs having a first end coupled to a body and a second end configured to slide along a length of the inner post.

15. The variable stiffness structure according to claim 14, wherein the hydraulic system comprises:
   a first hydraulic chamber between the first rubber disc and the negative stiffness element;
   a second hydraulic chamber between the first rubber disc and the negative stiffness element; and
   a valve system configured to move fluid between the first hydraulic chamber and the second hydraulic chamber to adjust the position of the negative stiffness element relative to the inner post, in response to the change in the variable load.

16. The variable stiffness structure according to claim 15, wherein a stiffness of the negative stiffness element remains substantially constant as the valve system adjusts the position of the negative stiffness element relative to the inner post.

17. The variable stiffness structure according to claim 1, wherein the hydraulic system comprises:
- a first hydraulic chamber coupled between the negative stiffness element and the variable load;
- a second hydraulic chamber coupled between the negative stiffness element and a body;
- a first accumulator; and
- a valve system configured to move fluid between the first accumulator and the first and second hydraulic chambers,
- wherein the each of the first and second hydraulic chambers is configured to exert fluidic pressure on the negative stiffness element to adjust the position of the negative stiffness element relative to the positive stiffness element, in response to the change in the variable load.

18. The variable stiffness structure according to claim 17, wherein the valve system is configured to increase or decrease fluidic pressures inside the first and second hydraulic chambers according to the change in the variable load.

19. The variable stiffness structure according to claim 17, wherein the valve system is configured to balance fluidic pressures between the first and second hydraulic chambers according to the change in the variable load.

20. The variable stiffness structure according to claim 17, further comprising a sensor coupled to one of the first and second hydraulic chambers,
- wherein the sensor is configured to sense a fluid pressure inside one of the first and second hydraulic chambers, and
- wherein the valve system is further configured to control the stiffness of the negative stiffness element according to the sensed fluid pressure.

21. The variable stiffness structure according to claim 17, wherein the hydraulic system further comprises a first actuator configured to push fluid from one of the first and second hydraulic chambers into another one of the first and second hydraulic chambers.

22. The variable stiffness structure according to claim 17, wherein the hydraulic system further comprises a second actuator configured to increase or decrease a fluidic pressure in the first accumulator.

23. The variable stiffness structure according to claim 17, wherein the hydraulic system further comprises:
- a second accumulator,
- wherein the valve system is further configured to move fluid between the second accumulator and the first and second hydraulic chambers.

24. An isolation system comprising:
- a body;
- a variable load; and
- the variable stiffness structure of claim 1 coupled to the body and the variable load and configured to isolate vibrations of the variable load from the body in presence of a change in the variable load.

25. The isolation system according to claim 24, wherein the hydraulic system comprises:
- a hydraulic chamber coupled to the negative stiffness element;
- an accumulator; and
- a valve system configured to move fluid between the hydraulic chamber and the accumulator,
- wherein the hydraulic chamber is configured to exert fluidic pressure on the negative stiffness element to adjust the position of the negative stiffness element relative to the positive stiffness element, in response to the change in the variable load.

26. The isolation system according to claim 24, wherein the hydraulic system comprises:
- a first hydraulic chamber coupled between the negative stiffness element and the variable load;
- a second hydraulic chamber coupled between the negative stiffness element and the body;
- a valve system configured to move fluid between the first hydraulic chamber and the second hydraulic chamber to adjust the position of the negative stiffness element relative to the positive stiffness element, in response to the change in the variable load.

* * * * *